(12) United States Patent
Brennan et al.

(10) Patent No.: US 7,296,696 B2
(45) Date of Patent: Nov. 20, 2007

(54) ORGANIZER ATTACHABLE TO COMPUTER MONITOR FRAME

(75) Inventors: Michael K. Brennan, Stoughton, WI (US); Mary K de la Rosa, Madison, WI (US); William T Graham, Evansville, WI (US); William N Isermann, Marshall, WI (US); Joann Martin, Middleton, WI (US); Mathias G Outhouse, Madison, WI (US); Charles E Bain, West Dundee, IL (US)

(73) Assignee: Dot Mfg. LLC, Madison, WI (US)

( * ) Notice: Subject to any disclaimer, the term of this patent is extended or adjusted under 35 U.S.C. 154(b) by 460 days.

(21) Appl. No.: 10/978,650

(22) Filed: Nov. 1, 2004

(65) Prior Publication Data

US 2006/0091095 A1 May 4, 2006

(51) Int. Cl.
*B42F 17/00* (2006.01)
(52) U.S. Cl. .......................... 211/113; 211/207; 211/10
(58) Field of Classification Search ................ 211/113, 211/10, 86.01, 175, 117, 207, 208; 248/918, 248/295.11, 297.21, 297.31
See application file for complete search history.

(56) References Cited

U.S. PATENT DOCUMENTS

| | | | | |
|---|---|---|---|---|
| 3,517,625 A * | 6/1970 | Swett | ..................... | 108/147.19 |
| 3,606,949 A * | 9/1971 | Joyce | ..................... | 211/126.5 |
| 4,011,672 A | 3/1977 | Grusin | | |
| 4,747,572 A | 5/1988 | Weber | | |
| 4,880,300 A * | 11/1989 | Payner et al. | ................ | 359/862 |
| 4,960,257 A * | 10/1990 | Waters | ..................... | 248/442.2 |
| 5,101,987 A | 4/1992 | Twedt | | |
| D336,197 S | 6/1993 | Wilcox | | |
| 5,292,099 A * | 3/1994 | Isham et al. | ............. | 248/442.2 |
| 5,370,060 A * | 12/1994 | Wang | ......................... | 108/44 |
| 5,615,854 A * | 4/1997 | Nomura et al. | .......... | 248/287.1 |
| 5,619,395 A | 4/1997 | McBride | | |
| 5,746,408 A * | 5/1998 | Theirl et al. | ........... | 248/295.11 |
| 5,806,693 A | 9/1998 | Carbonaro | | |
| 5,850,998 A | 12/1998 | Parsey et al. | | |
| 5,901,937 A * | 5/1999 | Compeau et al. | ........ | 248/442.2 |
| 5,953,999 A * | 9/1999 | Kanehl | ....................... | 108/44 |
| 5,975,478 A | 11/1999 | Marino | | |
| 5,988,582 A | 11/1999 | Olivo | | |
| 6,024,337 A * | 2/2000 | Correa | ..................... | 248/442.2 |
| 6,100,942 A * | 8/2000 | Hollenbaugh et al. | ...... | 348/836 |
| 6,152,311 A * | 11/2000 | German | .................. | 211/86.01 |
| 6,398,178 B1 | 6/2002 | Azola et al. | | |
| 6,412,889 B1 | 7/2002 | Hummell et al. | | |
| 6,430,856 B1 | 8/2002 | Schwartz | | |
| 6,478,282 B1 | 11/2002 | Flemming | | |
| 6,550,737 B1 | 4/2003 | Sai et al. | | |
| 6,983,919 B2 * | 1/2006 | Kroggel | ................... | 248/442.2 |
| 7,140,584 B2 * | 11/2006 | Bourque et al. | ......... | 248/274.1 |

* cited by examiner

*Primary Examiner*—Jennifer E. Novosad
(74) *Attorney, Agent, or Firm*—Quarles & Brady

(57) ABSTRACT

A configurable organizer is provided that is attachable to a computer monitor. The organizer includes a telescoping frame including a vertically extending main housing member and an auxiliary housing member connected to the main housing member. The auxiliary housing member is slideable in a vertical direction with respect to the main housing member and can be fixed at a plurality of vertical positions between a contracted position and an extended position. Desktop item-retaining implements are supported by the telescoping frame and, in particular, some are fixedly attached to the frame while others are modular, and thus removable and repositionable on the frame.

8 Claims, 5 Drawing Sheets

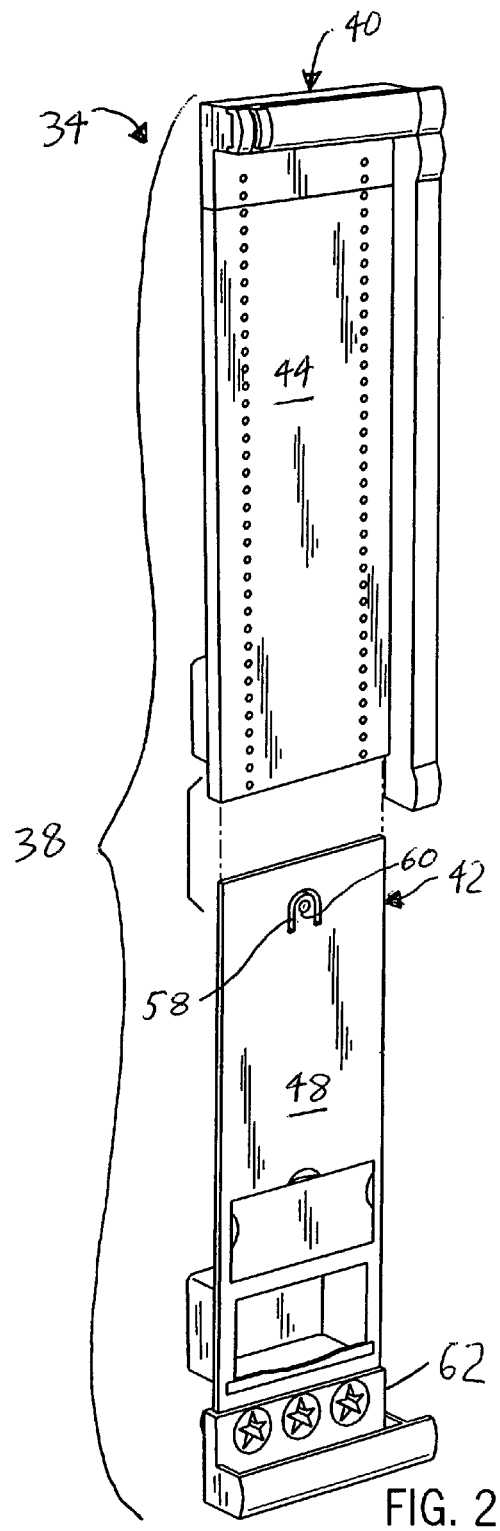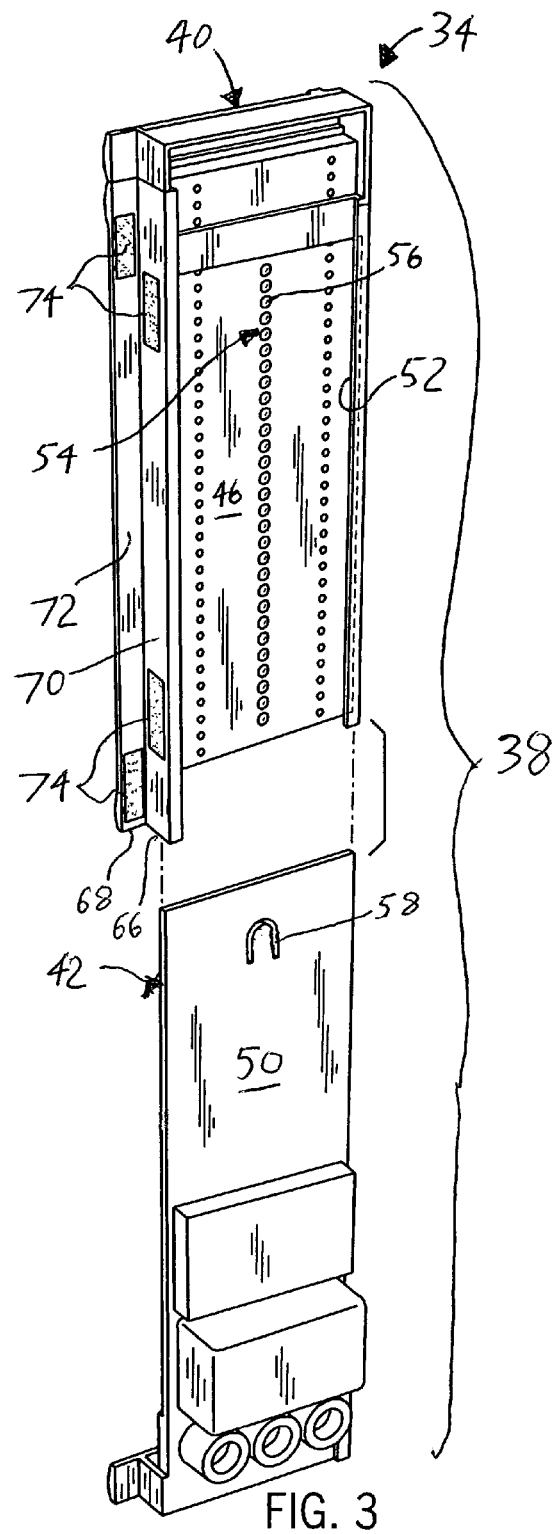

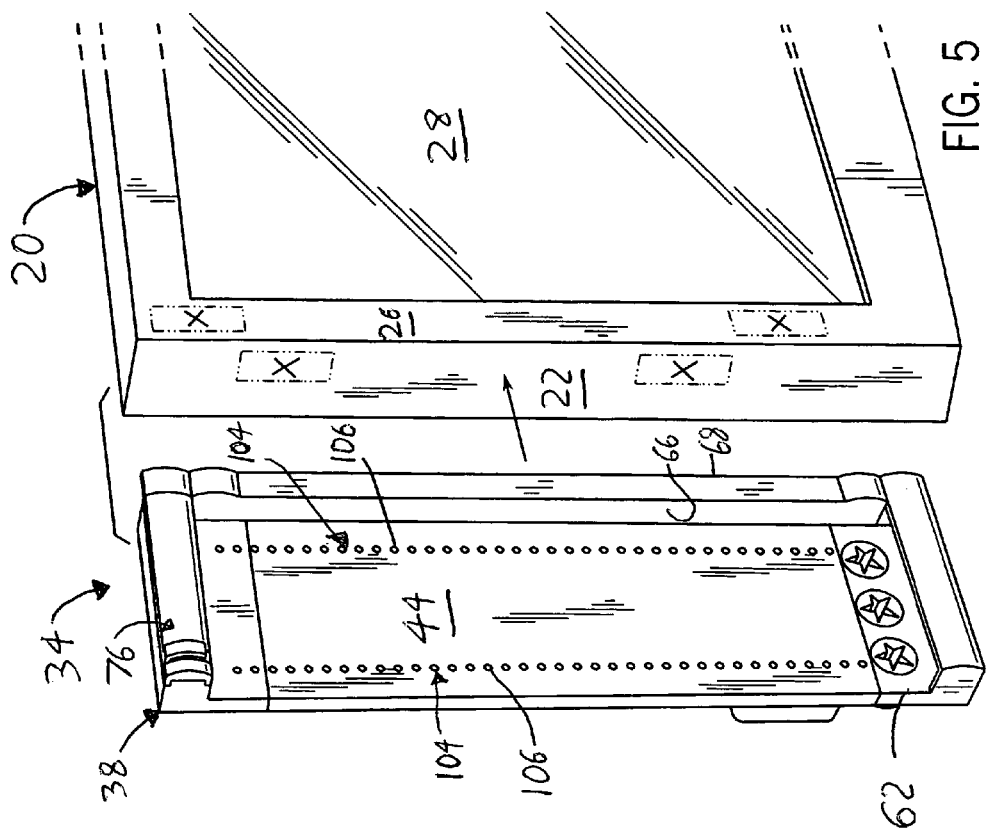
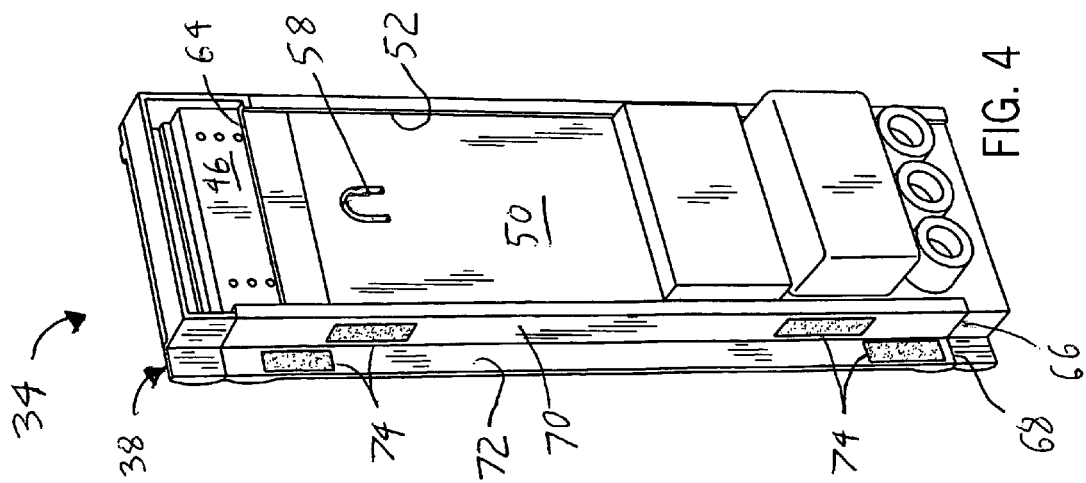

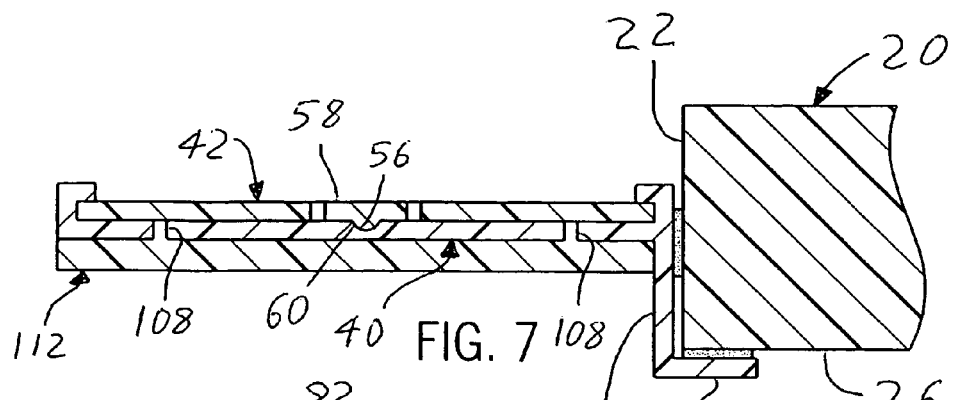
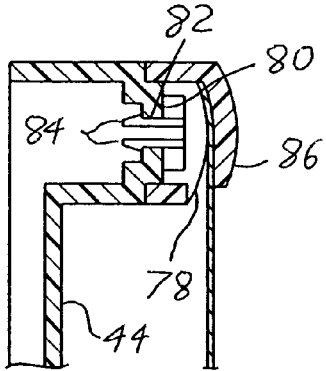
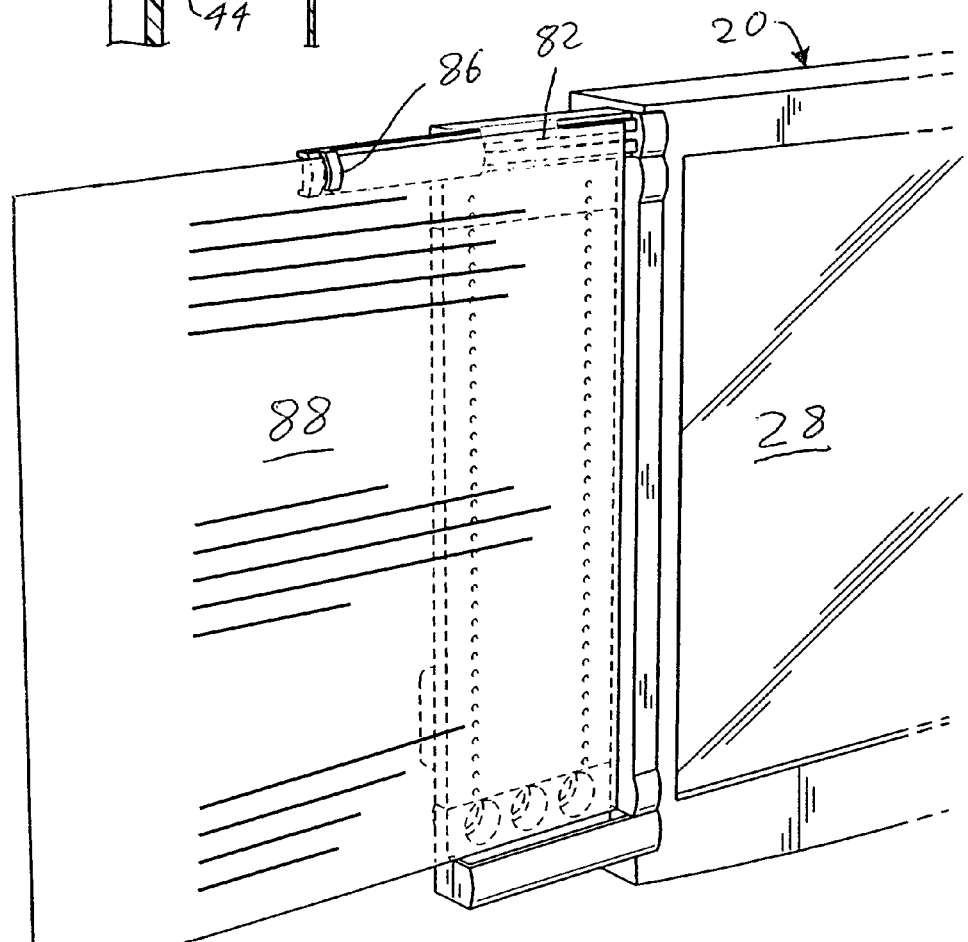

ORGANIZER ATTACHABLE TO COMPUTER MONITOR FRAME

CROSS-REFERENCE TO RELATED APPLIICATIONS

None

STATEMENT REGARDING FEDERALLY SPONSORED RESEARCH OR DEVELOPMENT

None

BACKGROUND

The present invention relates generally to desktop organizers, and in particular relates to a frame attachable to a computer monitor for the organization of desktop items for easy and convenient access.

In today's high paced office environment, increasing demands are placed upon individuals stationed at a computer workstation in areas of limited space, much of which is occupied by desktop computer components including a computer monitor. Accordingly, organization and easy access to necessary items is desired. Conventional organizers sit on the desktop and retain various items that may or may not be needed at a given point in time. However, these organizers occupy space on the desktop regardless of whether the user needs to access the retained items. Accordingly, in instances where access to the stored items is not needed, the organizer still occupies valuable desktop space, and reduces the space available for other items, such as notes, business cards, personal effects, writing implements, and the like.

In an effort to maximize available desktop space and to provide easy access to desktop items, a number of organizers have been proposed that attach to a computer monitor. Conventional organizers hold clipboards that enable easy visual access to documents, while other organizers include bins and the like for holding miscellaneous desktop items. Still other organizers include apparatus that receives computer-related accessories such as compact disks and floppy disks.

Unfortunately, while these organizers are suitable for their intended purpose, none are configurable to provide flexibility based on a user's given needs. For instance, if an organizer includes bins that are not needed, the user is unable to remove the bins or replace them with other more desired desktop item-retaining implements. Furthermore, the size of conventional monitor-attached organizers is fixed. What is therefore needed is an organizer that is attachable to a desktop monitor that is also configurable by the user.

SUMMARY

In accordance with one aspect of the present invention, a configurable organizer is provided that is attachable to a computer monitor. The organizer includes a telescoping frame including a vertically extending main housing member and an auxiliary housing member connected to the main housing member. The auxiliary housing member is slideable in a vertical direction with respect to the main housing member and can be fixed at a plurality of vertical positions between a contracted position and an extended position. At least one desktop item-retaining implement supported by the telescoping frame.

In accordance with another aspect of the invention, a configurable organizer attachable to a computer monitor includes a telescoping frame configured to be supported by the computer monitor. The frame presents a plurality of mounting locations, and at least one desktop item-retaining implement is fixedly attached to the frame. At least one modular desktop item-retaining implement is removably connected to one of the mounting locations and repositionable at one of the plurality of mounting locations.

The foregoing and other aspects of the invention will appear from the following description. In the description, references are made to the accompanying drawings which form a part hereof, and in which there is shown by way of illustration, and not limitation, a preferred embodiment of the invention. Such embodiment does not necessarily represent the full scope of the invention, however, and reference must therefore be made to the claims for interpreting the scope of the invention.

BRIEF DESCRIPTION OF THE DRAWINGS

Reference is hereby made to the following figures in which like reference numerals correspond to like elements throughout, and in which:

FIG. 2 is an exploded front perspective view of one of the organizers illustrated in FIG. 1, showing a telescoping frame including an main housing member and an auxiliary housing member slideable with respect to the main housing member;

FIG. 3 is an exploded rear perspective view of the organizer illustrated in FIG. 2;

FIG. 4 is a perspective view of the organizer illustrated in FIG. 2, showing the auxiliary housing member sliding along the main housing member, and further showing mounting locations that attach to the computer monitor;

FIG. 5 is a perspective view of the organizer illustrated in FIG. 4, showing the main housing member being mounted along an upstanding side wall of a computer monitor;

FIG. 7 is a sectional elevation view taken along line 7-7 of FIG. 6 illustrating the sliding interface between the auxiliary housing member and the main housing member;

FIG. 8 is a sectional elevation view taken along line 8-8 of FIG. 6 illustrating the document holder; and FIG. 9 is a perspective view of the organizer illustrated in FIG. 6 in a contracted configuration and supporting a document using the document holder.

DETAILED DESCRIPTION

Figure 1:
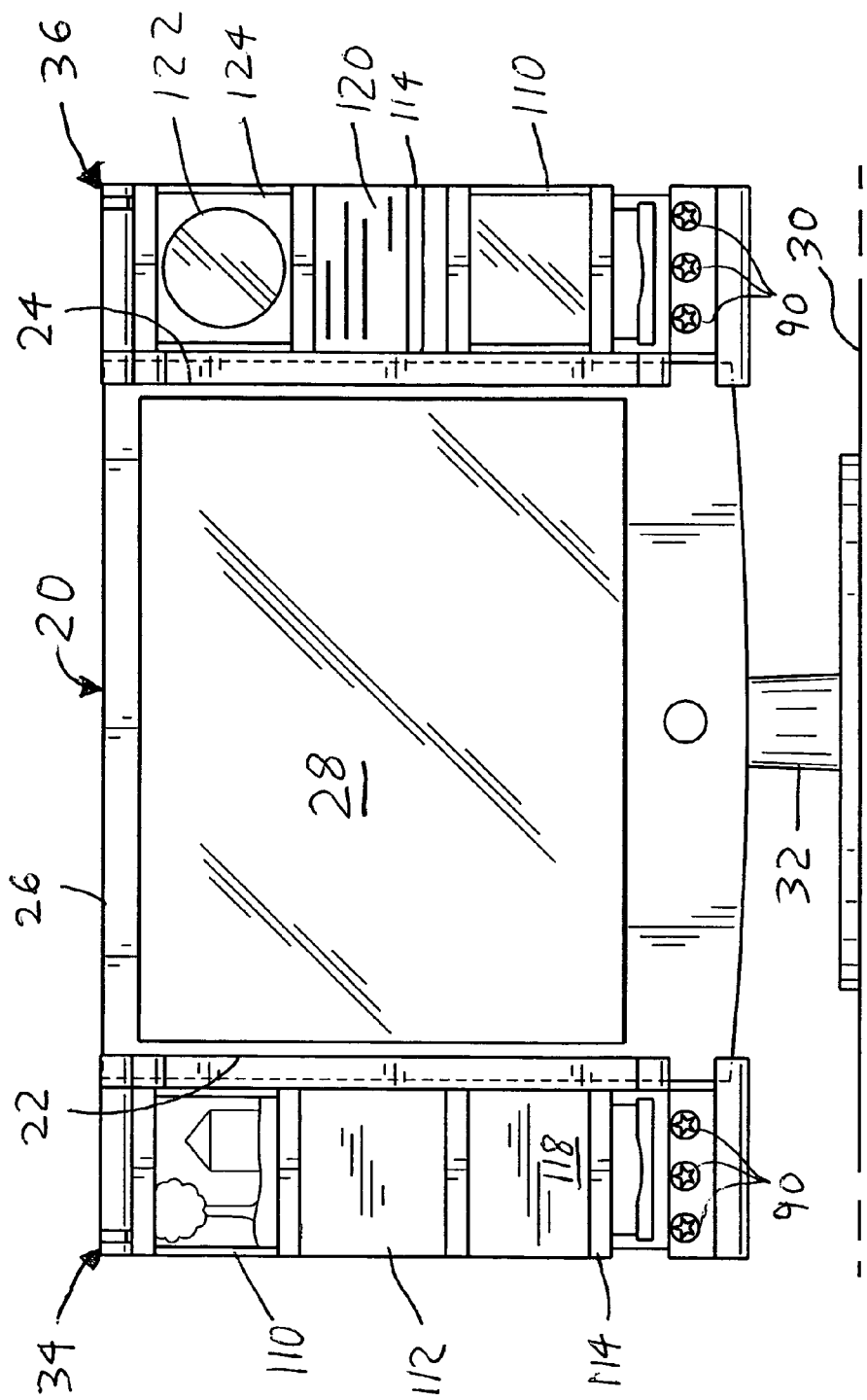
FIG. 1 is a front elevation view of a pair of organizers mounted along the upstanding side walls of a computer monitor.

Referring to FIG. 1, a computer monitor 20 includes opposing left and right upstanding side walls 22 and 24, respectively, and a frame member 26, surrounding a screen 28, connected between side walls 22 and 24. Frame member 26 is supported on a desktop 30 via a monitor stand 32. A pair of symmetrical organizers 34 and 36 is attached to opposing side walls 22 and 24, respectively, each organizer being operable to retain various removable desktop items as desired by the user. Organizers 34 and 36, and their attachments, are preferably formed from a plastic unless otherwise indicated.

Because organizers 34 and 36 are symmetrical, both will be described with reference to organizer 34 as the description of organizer 36 applies generally to organizer 34, it being appreciated that organizer 34 is configured to be mounted onto left side wall 22 while organizer 36 is configured to be mounted onto right side wall 24.

Referring also to FIGS. 2 and 3, organizer 34 includes a telescopic frame 38 having a main housing member 40 and an auxiliary housing member 42 slideable with respect to main housing member 40. Auxiliary housing member 40 can thus be referred to as an adjustable extension of main housing member 40 that enables the user to expand and contract organizer 34 as desired to match the dimensions of computer monitor 20. For the purposes of this description, the terms "front" and "rear" are used with respect to a direction facing toward and away from a user stationed at monitor 20, respectively, while the terms "laterally inner" and "laterally outer" refer to directions facing toward and away from monitor 20, respectively.

Main housing member 34 includes a front face 44 that faces the user when mounted to monitor 20, and a rear face 46 disposed opposite front face 44. Auxiliary housing member 42 includes a front face 48 that interfaces with rear face 46 of main housing member 40, and a rear face 50 disposed opposite the front face 48.

In particular, a rail 52 (one shown) extends vertically from rear face 46 along the laterally inner and outer edges of main housing member 40. Each rail 52 defines a vertically extending groove disposed between itself and rear face 46 that receives the corresponding lateral edges of auxiliary housing member 42. Rails 52 thus retain auxiliary housing member 42, and enable auxiliary housing member 42 to slide vertically relative to main housing member 40 during operation. The position of auxiliary housing member 42 can be fixed via a track 54 extending centrally along rear face 46. Track 54 is formed from a plurality of vertically spaced, and substantially hemispherical, locating depressions in the form of detents 56 formed in rear face 46. An inverted U-shaped portion 58 is partially cutout from, and hingeably connected to, auxiliary housing member 42, and includes a substantially hemispherical projection 60 extending outwardly from the upper end of cutout portion 58. Projection 60 is sized to engage detents 56, and is further centrally disposed and therefore aligned with track 54.

During operation, when auxiliary housing member 42 is retained by rails 52 and translated relative to main housing member 40, projection 60 rides along detents 56 and rear face 46 in alternating fashion. Referring also to FIG. 7, cutout portion 58 is in its normal position (i.e., substantially flush with front and rear surfaces 48 and 50) when projection 60 is in engagement with one of the detents 56. When auxiliary housing member 42 is translated relative to main housing member 40, projection 60 is forced out of engagement with the detent and rides along rear surface 46, thus causing cutout portion 58 to flex and exert a force that biases projection 60 into engagement with the next detent 56 as auxiliary housing member 42 continues to travel. Once the auxiliary housing member 42 has been translated to its desired position (e.g., to match the vertical dimensions of computer monitor 20), the engagement between projection 60 and the desired detent 56 will resist further movement of auxiliary housing member 42 during normal operation until the user exerts a translating force to adjust the vertical position of auxiliary housing member 42 as desired. The auxiliary housing member 42 is said to be fixed when projection 60 is in engagement with a detent 56. Alternatively, in accordance with one aspect of the invention, auxiliary housing member 42 can be removed entirely from main housing member 40 if desired.

Referring also to FIGS. 4 and 5, an enlarged rectangular section 62 is disposed at the lower end of auxiliary housing member 42, and has a thickness such that the front face of rectangular section 62 abuts, and is substantially flush with, front face 44 of main housing member 40 when frame 38 is fully contracted. The laterally outer edge of rectangular section 62 also extends beyond that of auxiliary housing member 42 so as to be substantially flush with the laterally outer edge of main housing member 40. A beam 64 extends horizontally across the upper end of inner surface 46, and engages the upper edge of auxiliary housing member 42 to further limit the permissible upward vertical travel.

Frame 38 is attached to monitor 20 by way of a first vertical flange 66 that extends forwardly along the laterally inner edge of main housing member 40. A second vertical flange 68 extends laterally inwardly from, and perpendicular to, first flange 66. Both flanges 66 and 68 present corresponding monitor-engaging surfaces 70 and 72, upon which a double-stick adhesive tape 74 or the like can be placed. Flange surface 70 is brought into engagement with side wall 22, while flange surface 72 is brought into engagement with frame member 26 to affix adhesive 74 to monitor 20 at a position whereby the upper end of main housing member 20 is substantially flush with the upper end of monitor 20. Because flanges 70 and 72 extend substantially along the entire, or at least a significant, vertical portion of side wall 22, the connection between organizer 34 and monitor 20 is robust and capable of withstanding greater forces than conventionally achieved. It should also be appreciated that, once frame 38 has been attached to monitor 20, auxiliary housing member 42 can be translated as desired such that its lower end is substantially flush with the lower end of monitor 20.

Figure 6:
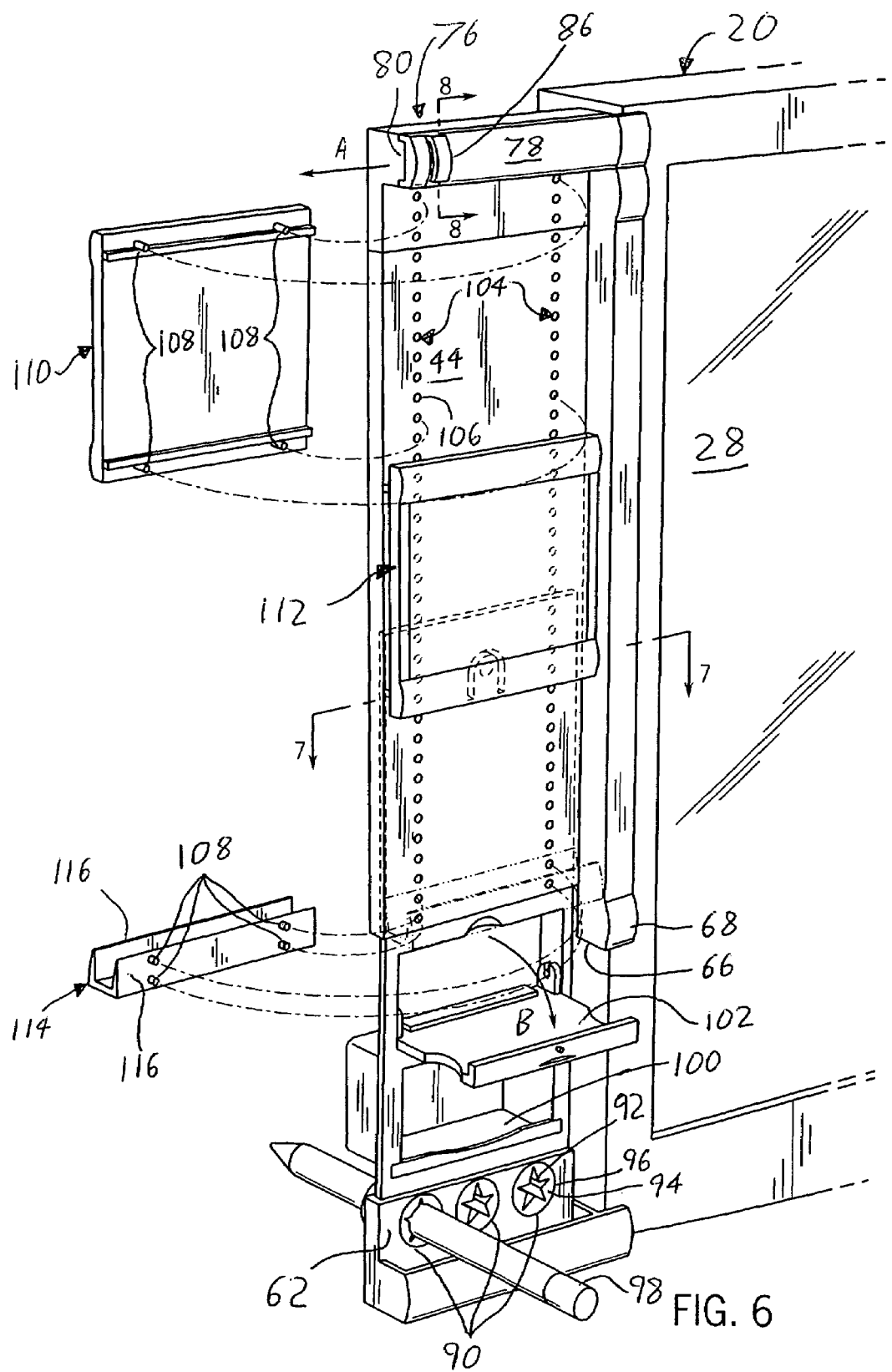
FIG. 6 is a perspective view of the organizer illustrated in FIG. 5 in an extended configuration with various removable accessories and mounted to the computer monitor.

Referring now to FIG. 6, organizer 34 includes a plurality of desktop item-retaining implements fixedly supported by both outer frame 40 and inner frame 42. Some of the fixed implements attached to inner frame 42 can be selectively accessible depending upon the position of inner frame member 42. Furthermore, a plurality of modular implements can be selectively coupled to outer frame 40. Exemplary fixed and modular implements will now be described.

Specifically, referring also to FIGS. 8 and 9, a document holder 76 is disposed at the upper end of main housing member 40. Document holder 76 includes a horizontal bar 78 slideably coupled to a horizontally extending header member 80 disposed forwardly from outer surface 44. A slot 82 extends horizontally through header 80, and receives a plurality of barbed slider members 84 extending rearward from horizontal bar 78. A clip 86 is disposed at the laterally outer end of bar 78, and extends downwardly from the upper end of bar 78. Clip 86 defines a concave inner surface that interacts with a convex outer surface of bar 78 to retain a paper or other similar document 88 therebetween. During operation, bar 78 can be translated along the direction of Arrow A to its laterally outermost position, such that standard 8½ by 11 inch sheets are centrally supported by clip 86 without overlapping monitor frame 26. Furthermore, the outer surface of bar 78 is substantially flush with the outer surface of flange 68.

Referring again to FIG. 6, a plurality of implements is fixedly supported by auxiliary housing member 42. Specifically, one or more writing implement holders 90 are formed in rectangular member 62 disposed at the lower end of auxiliary housing member 42. Each holder 90 is formed from an aperture 92 extending through a resilient material 94 that is, in turn, disposed in an aperture 96 extending through rectangular member 62. Each aperture 92 is sized to snugly receive a writing implement 98, such as a pencil, pen, or the like. In accordance with one aspect of the invention, three such holders 90 are arranged in a horizontal orientation across rectangular member, and are thus accessible even when frame 38 is fully contacted.

Additional implements fixedly supported by auxiliary housing member 42 include a tray 100 provided in the form of a rectangular pocket disposed above writing implement holders 90 for the storage of paper clips and the like. A shelf 102 is hingeably connected at its lower end to inner frame member 42 and, when opened about the direction of Arrow B, can retain various miscellaneous items. Tray 100 and shelf 102 are disposed behind outer frame member 40 and are hidden when frame 38 is fully contracted, and can be accessed when frame 38 is extended. The user can thus configure organizer 34 by positioning auxiliary housing member 42 as desired.

In addition to the fixed implements, a plurality of modular implements that retain desktop items is also provided that can be attached to, and removed from, outer frame 40 as desired to configure organizer 34. Specifically, with continuing reference to FIG. 6, a pair of parallel tracks 104 extends vertically along main housing member 40 and provides a plurality f mounting locations for the modular implements. Each track 104 is formed from a plurality of vertically spaced, equidistantly spaced, substantially cylindrical apertures 106 extending through housing member 40. Each implement includes, at its rear face, a plurality of outstanding substantially cylindrical pegs 108 that are spaced a predetermined distance from each other such that each peg 108 is inserted in one of the apertures 106 when the implement is mounted to frame 38. The pegs 108 and apertures 106 are sized such that a pressure fit is formed when pegs 108 are inserted, thus preventing the corresponding implement from becoming unintentionally disengaged during operation.

Referring also again to FIG. 1, one exemplary modular implement includes a picture frame 110 mounted to main housing member 40 via pegs 108 extending from its rear surface. Another example is a dry-erase board 112 that also is mounted to main housing member 40 via includes pegs 108 extending from its rear surface. Another example of a modular implement is a holder 114 formed from a pair of laterally extending base members 116 that are spaced to retain a pack of Post-it™ notes 118, business card(s) 120, or the like. The rearward base member 106 is mounted to main housing member 40 via pegs 108 extending from its rear surface. Yet another example of a modular implement includes a convex mirror 122 supported by a frame that is mounted to main housing member 40 via pegs 108 extending from its rear surface. One or more of the above-described modular implements (e.g., picture frame 110), or other desirable modular implements not described could be provided and mounted onto main housing member 40.

Organizer 34 is thus advantageously configurable in several ways to accommodate the desires of the user. First, organizer 34 can be constructed so as to be mounted on either the left side wall 22 or the right side wall 24 of monitor 20, based on the user's preferences. Alternatively, a pair of organizers 34 and 36 can be mounted to both side walls 22 and 24, as illustrated in FIG. 1. Additionally, organizer 34 can be extended based on either the desired height or the desired accessibility of the various desktop item-retaining implements. Furthermore, a plurality of modular desktop item-retaining implements can be selectively attached to organizer 36 as desired. Moreover, the position of each desired modular implements is adjustable and removable.

It should be appreciated that the fixed and modular implements described above are presented as examples only, and that other desktop-retaining implements could be provided as desired in the manner described above and, accordingly, the present invention is not to be narrowly construed as being limited to the examples provided above.

The above has been described as a preferred embodiment of the present invention. It will occur to those that practice the art that many modifications may be made without departing from the spirit and scope of the invention. For instance, while the primary intended use of organizer 36 is to be coupled to computer monitor 20, it should be appreciated that other similar uses are anticipated by the present inventors, including attachment to devices other than computer monitors. In order to apprise the public of the various embodiments that may fall within the scope of the invention, the following claims are made.

We claim:

1. A configurable organizer attachable to a computer monitor, the organizer comprising:
    a telescoping frame including a vertically extending main housing member and an auxiliary housing member connected to the main housing member, wherein the auxiliary housing member is slideable in a vertical direction with respect to the main housing member and can be fixed at a plurality of vertical positions along the main housing member, the main housing member including a first vertical flange connected along a side of the main housing member and a second vertical flange connected to the first vertical flange in an approximately L-shaped arrangement along the side of the main housing member, the first vertical flange and the second vertical flange being configured to mount to the monitor;
    at least one desktop item-retaining implement supported by the telescoping frame including a plurality of modular implements, each one selectively positionable at multiple locations on the frame and removable from the frame; and
    wherein the plurality of modular implements includes a locking member and the main housing member comprises a track that is engaged by the locking member extending from the modular implements.

2. The organizer as recited in claim 1, wherein the main housing member comprises a pair of guide rails that receive the auxiliary housing member.

3. The organizer as recited in claim 1, wherein the main housing member and the auxiliary housing member include a plurality of engagement members that interlock to fix the vertical position of the auxiliary housing member with respect to the main housing member.

4. The organizer as recited in claim 3, wherein the engagement members include a projection extending from the auxiliary housing member and a plurality of depressions formed in the main housing member.

5. The organizer as recited in claim 4, wherein the depressions are arranged as a vertical track.

6. The organizer as recited in claim 1, wherein at least one of the plurality of modular implements is fixedly supported by the main housing member and comprises a document holder comprising a retaining clip that is slideable in a horizontal direction relative to the frame.

7. The organizer as recited in claim 1, wherein the track comprises a plurality of apertures extending through the main housing member, and the locking member comprises a peg sized to be received by the apertures.

8. The organizer as recited in claim 1, wherein the plurality of modular implements is selected from the group consisting of a writing implement holder, a tray, a picture frame, a dry-erase board, a convex mirror, a document holder, and a business card holder.

* * * * *

UNITED STATES PATENT AND TRADEMARK OFFICE
CERTIFICATE OF CORRECTION

PATENT NO. : 7,296,696 B2
APPLICATION NO. : 10/978650
DATED : November 20, 2007
INVENTOR(S) : Michael K. Brennan et al.

It is certified that error appears in the above-identified patent and that said Letters Patent is hereby corrected as shown below:

Column 1, Line 5
"APPLIICATIONS" should be
--APPLICATIONS--

Signed and Sealed this

Fifteenth Day of April, 2008

JON W. DUDAS
*Director of the United States Patent and Trademark Office*